Dec. 18, 1962   G. A. REESE   3,069,682
TRANSDUCING SYSTEM
Filed Feb. 2, 1960   7 Sheets-Sheet 1

INVENTOR:
Glenn A. Reese
Attorneys.

Dec. 18, 1962  G. A. REESE  3,069,682
TRANSDUCING SYSTEM
Filed Feb. 2, 1960  7 Sheets-Sheet 2

INVENTOR:
Glenn A. Reese
By Smyth & Roston
Attorneys

Dec. 18, 1962 G. A. REESE 3,069,682
TRANSDUCING SYSTEM
Filed Feb. 2, 1960 7 Sheets-Sheet 3

INVENTOR:
Glenn A. Reese

Attorneys.

Dec. 18, 1962 G. A. REESE 3,069,682
TRANSDUCING SYSTEM
Filed Feb. 2, 1960 7 Sheets-Sheet 4

INVENTOR:
Glenn A. Reese

By Smyth & Roston
Attorneys

Dec. 18, 1962　　　　G. A. REESE　　　　3,069,682
TRANSDUCING SYSTEM

Filed Feb. 2, 1960　　　　　　　　　　7 Sheets-Sheet 5

INVENTOR
Glenn A. Reese
By Smyth & Roston
Attorneys.

Dec. 18, 1962   G. A. REESE   3,069,682
TRANSDUCING SYSTEM
Filed Feb. 2, 1960   7 Sheets-Sheet 6

INVENTOR:
Glenn A. Reese

Smyth & Roston
Attorneys.

Dec. 18, 1962　　　　　　　G. A. REESE　　　　　　　3,069,682
TRANSDUCING SYSTEM
Filed Feb. 2, 1960　　　　　　　　　　　　　　　7 Sheets-Sheet 7

INVENTOR:
Glenn A. Reese
By Smyth, Roston
Attorneys.

United States Patent Office 3,069,682
Patented Dec. 18, 1962

3,069,682
TRANSDUCING SYSTEM
Glenn A. Reese, Canoga Park, Calif., assignor to The Magnavox Company, Los Angeles, Calif., a corporation of Delaware
Filed Feb. 2, 1960, Ser. No. 6,133
10 Claims. (Cl. 346—107)

The present invention relates to assemblies for recording digital information in correlation with pictorial data, and the invention is more particularly directed to improved digital recording assemblies which enable digital information to be recorded on a film strip in a motion picture camera in correlation with the pictorial data simultaneously recorded in successive film frames of the film strip.

The improved digital recording assembly of the invention is intended to be used in conjunction with apparatus which produces a pictorial record of a test subject under actual operating conditions, and the assembly of the invention enables digital recordings to be recorded adjacent the pictorial record. These digital recordings may represent data pertinent to the test being carried out on the subject; and such data may include, for example, readings pertaining to the temperatures, stresses, pressures, time, and so on, present during the test.

The improved digital recording assembly of the invention in one of its embodiments enables digital data to be recorded on a film strip in correlation with frames of relevant pictorial information, as noted above. This provides a convenient means for obtaining permanent records of data pertaining to the test subject, while the subject is in actual operation; and for obtaining such records in conjunction with permanent pictorial records of the actual operation of the equipment itself.

The digital recording assembly of the present invention enables instantaneous readings of control data to be digitally recorded in successive film frames on the film strip of a camera and to be recorded in correlation with pictorial data which is also recorded in such successive film frames. By way of illustration, the control data for a particular frame may indicate that the frame shows a picture of an ear of corn when the different frames are searched for ears of corn.

The improved digital recording assembly of the invention, for example, may find application in such diverse fields as document filing, engineering tests and business records.

The improved assembly of the invention includes a digital recording head of unique and improved construction. The recording head to be described, for example, contains an array of miniature electrically energized lamps. By way of illustration, a recording head constructed in accordance with the invention has been provided with a rectangular shape and measures 0.9 inch by 0.5 inch, and it contains a 6 by 8 miniature lamp array.

In the constructed embodiment of the invention, and in the embodiment to be described, the lamps are mounted in the digital recording head in clusters of four lamps. The lamps are so mounted, as will be described, for ease of replacement of burned-out lamps. Certain important features of the improved recording head to be described are that it is small, compact and rugged. Moreover, the improved recording head of the invention is constructed to enable the lamps contained in it to be easily replaced when they become burned out, and it is also constructed to permit additional similar digital recording heads to be conveniently added on a modular basis for the larger data displays.

An additional feature of the improved mechanism of the present invention resides in the provision of an improved digital recording head assembly which is constructed to be conveniently incorporated into many types of existing present day cameras, with only relatively small modifications to the cameras being required.

The mechanism of the invention is also advantageous in that it is capable of withstanding excessive vibration and may be subjected to extremely high accelerations and amplitude levels without any evidence of damage.

Figure 1:
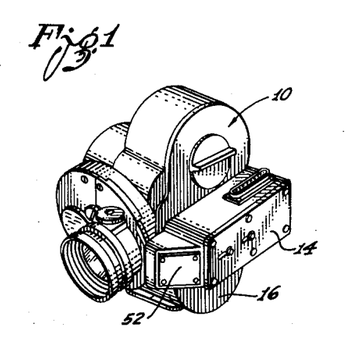
FIGURE 1 shows a moving picture camera with a recording head assembly constructed in accordance with the concepts of the present invention mounted on the side panel of its housing, the camera being modified in a simple manner to incorporate a lens assembly for projecting images from the face of the digital recording head to a portion of the film strip in the camera.
Figure 2:
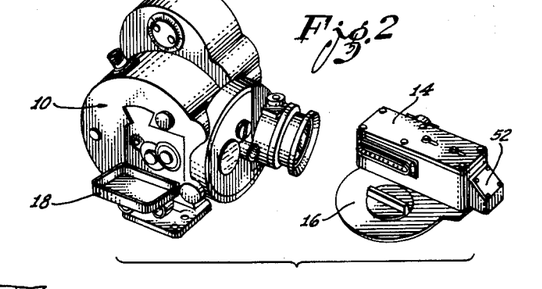
FIGURE 2 shows the motion picture camera of FIGURE 1 with the side panel of its housing, upon which the recording head assembly of the invention is normally mounted, removed from the camera; and with the access door of the camera being open in this view to reveal the speed gears of the camera and its variable shutter.

The camera illustrated in FIGURES 1 and 2 is a commercially available camera, the particular illustrated camera being manufactured by the Traid Corporation of 17136 Ventura Boulevard, Encino, California and represented by them as their "35 millimeter Traid 75A Fototracker." The motion picture camera is represented at 10 in FIGURES 1 and 2.

Figure 4:
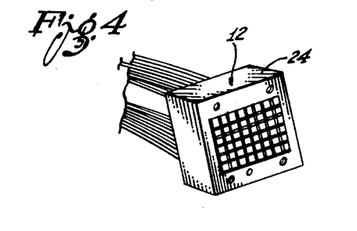
FIGURE 4 is a front perspective view of the recording head constructed in accordance with the invention, the illustrated head containing a plurality of individually energized miniature electric lamps arranged in the above noted array in a plurality of rows and columns.
Figure 5:
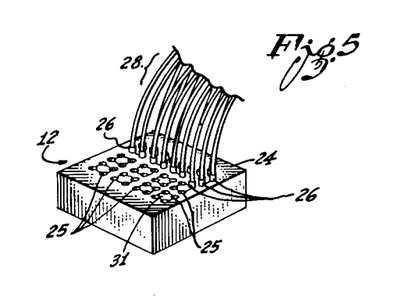
FIGURE 5 is a rear perspective view of the digital recording head of the invention to illustrate particularly the manner in which electric leads are brought into contact with the individual lamps in the digital recording head and the manner in which the lamps are supported in clusters in the head.

The digital recording head of the present invention is indicated at 12 in FIGURES 4 and 5, insofar as the embodiment to be described is concerned. The digital recording head 12 is mounted in a housing 14 (FIGURES 1 and 2) and the housing 14 is mounted on a door 16 of the camera housing. The view in FIGURE 1 shows the door 16, together with the housing 14, mounted on the camera 10; and the view of FIGURE 2 shows the door 16 and the attached housing 14 removed from the camera. The access door 18 of the camera in FIGURE 2 is shown open to reveal the speed change gears and the variable shutter control for the camera.

As will be described, the digital recording head 12 supports an array of individually energized miniature lamps. In the illustrated embodiment, forty-eight lamps are used in a 6 by 8 array. The housing 14 is mounted on the camera 10 in a manner so that the individual illuminations from the array of lamps in the digital recording head 12 supported in housing may be relayed into the camera and directed onto the film strip in the camera. The elements which form the optical path from the face of the digital recording head 12 into the camera will be described in more detail subsequently.

Figure 3:
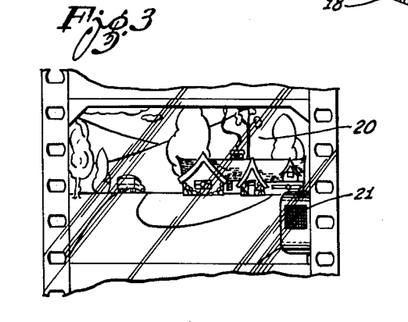
FIGURE 3 shows a typical film frame on the film in the camera, this frame containing pictorial images of a particular scene, and the frame also containing digital information as revealed by the images in the frame of illuminated ones of an array of lamps incorporated into the digital recording head.

FIGURE 3 illustrates a film frame 20 of the motion picture film in the camera 10. The frame contains a pictorial representation of a particular scene, and it also contains a matrix image 21 which designates the illumination pattern of the array of lamps in the digital recording head 12. The matrix image appears to one side of the film frame, and it represents in digital code, information relative to the pictorially represented scene or test subject in the accompanying film frame. As noted, several digital recording heads, in addition to the head 12 and similar to that head, can be used together for the larger displays. A second head may be supported in such a position that the digital information from it would appear, for example, directly under the matrix image 22 in FIGURE 3.

As noted above, the system provides, for example, permanent storage of test data adjacent the pictorial record of the test subject. This permits such data pertaining, for example, to time, temperature, pressure, etc., to be added by means of the data matrix 21 to the pictorial record in the corresponding film frame. When used at the rate, for example, of eighty frames per second, 7680 bits per second may be so recorded on the film strip.

Figure 6:
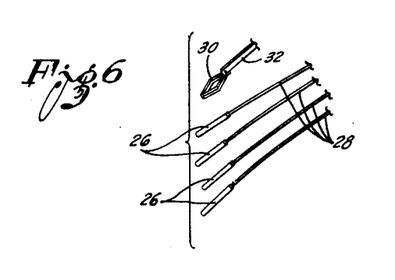
FIGURE 6 illustrates a group of four tubular miniature electric lamps which may be supported as a cluster in the recording head of the invention, and a resilient ground pressure clip for holding the lamps removably in place in the head; the individual lamps, as illustrated, being enclosed in a conductive tubular sleeve which makes one of the connections to the particular lamp and the lamps being potted in a light diffusing material.
Figures 7, 8:
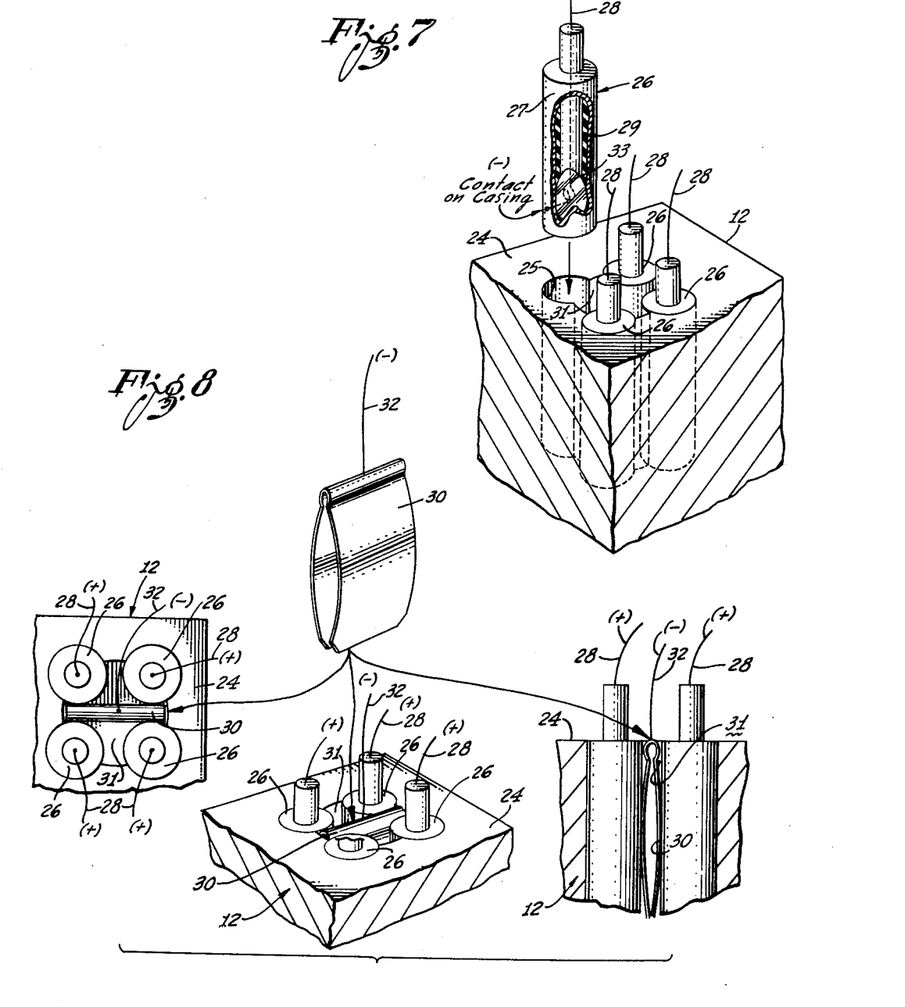
FIGURE 7 is a perspective fragmentary view of a portion of the digital recording head of FIGURE 5, on an enlarged scale, this latter view showing how the lamps are supported in the head in clusters of four, and this view also showing the composition of one of the lamps.
FIGURE 8 is a functional schematic, fragmentary showing of portions of the digital recording head of FIGURE 5, likewise on an enlarged scale, and revealing the manner in which the ground pressure clip of FIGURE 6 serves to hold the lamp of the corresponding cluster in their apertures in the head.

As shown in FIGURES 4–8, and as will be described in detail subsequently, the digital recording head 12 includes an apertured block 24. The holes 25 in the block member extend through the member from the rear face to the front face of the member. A plurality of electrically energized incandescent sub-miniature lamp assemblies 26, as shown in FIGURES 6 and 7, for example, are supported in the holes 28 in the block 24. Each one of the sub-miniature incandescent lamp assemblies 26 illuminates, for example, an area of 10 mils on a side, with the lamps being separated by 10 mil spaces. The lamp assemblies 26 may be of the type, for example, which operate at 1 volt. The lamp assemblies may be easily replaced when they burn out, as will be described in detail subsequently.

Each of the sub-miniature lamp assemblies 26 includes a tiny electric lamp 33. The lamp 33 is supported in a metallic tube 27 (FIGURE 7) which forms a contact to one side of the lamp element. A lead, such as the leads 28, extends to each of the lamps 33 within its metallic tube, and this lead forms the connection to the other side of the lamp element. The lamps 33 may be sealed in their corresponding tubes, by a light-diffusing resinous material 29 (FIGURE 7). The tube diameter may, for example, be 65/1000 of an inch. The sub-miniature lamp assemblies 26 may be of the type presently being manufactured by the American Cystoscope Makers, Incorporated. The leads 28 may, for example, be connected to the positive terminal of a direct current energizing source by suitable analog-to-digital converters, as will be described.

As illustrated in FIGURES 5, 7 and 8, for example, the space between each group of four holes in the block 24 is reamed out from the top of the block to form holes or depressions 31 in the top face of the block between each group of four holes 25. These holes 31, as will be described in more detail, extend partially through the block and communicate with the surrounding holes 25. A support plate is secured to the front face of the block 24, as will be described, and this support plate is apertured. The support plate serves to retain the tubular sub-miniature lamp assemblies 26 in the respective holes 25. As shown in FIGURES 5 and 7, the lamp assemblies 26 are inserted in the corresponding holes 25 in the block 24 from the top of the block, to be supported therein by the apertured support plate secured to the front face of the block member.

The tubular sub-miniature lamp assemblies 26 are supported in their respective apertures of each group of four by a resilient ground clip 30 (FIGURES 6, 7 and 8). These resilient clips are inserted in the reamed out holes 31 between each group of four apertures in the block 24. As best shown in FIGURE 8, each ground clip bears against the tubular surfaces of the miniature lamp assemblies in the corresponding group of apertures. The ground clips serve not only to establish a connection to the tubular portions of the lamp assemblies 26, but also to resiliently hold each cluster of four miniature lamps within the corresponding four apertures of each group.

Wherever it is desired to remove a burned out lamp, it is merely necessary to withdraw the four lamps of its cluster and its ground clip 30 from the block 24. The burned out lamp assembly may then be replaced, and four operable lamp assemblies returned to the block 24. The ground clip is then pushed into place to resiliently hold the lamps in the block 24, and to establish connection to the tubular portions of each lamp of the cluster.

Therefore, each sub-miniature lamp assembly 26 in the bank supported by the digital recording head 12 is energized individually by controlling the signals applied to different ones of the leads 28. A common ground connection is provided from the grounded negative terminal of the direct current source through the different ground clips 30 and their corresponding connecting leads 32 (FIGURE 6) to complete the circuits.

Figure 9:
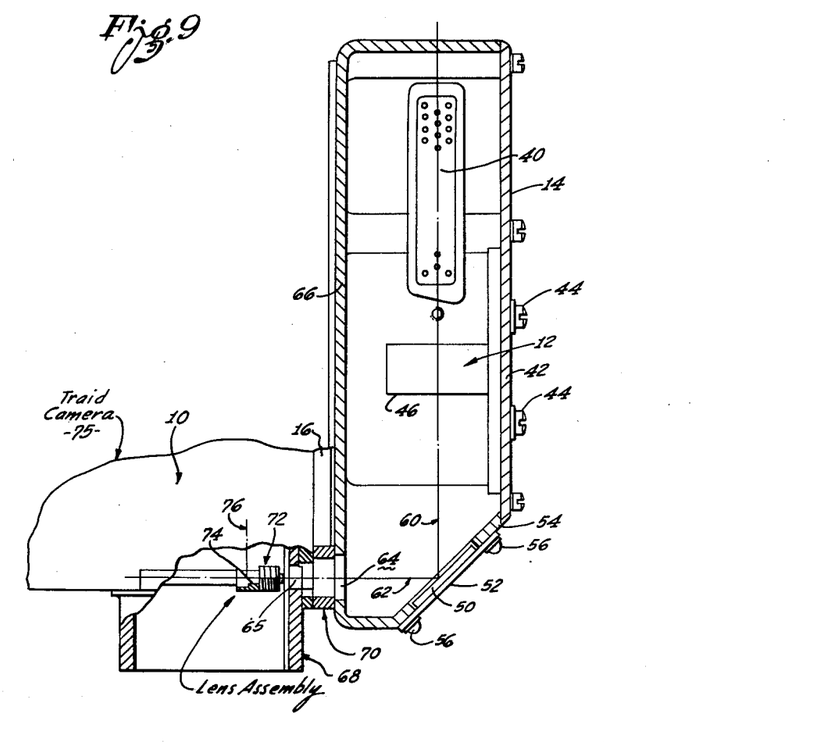
FIGURE 9 is a top sectional view of the digital recording head assembly constructed in accordance with the invention and mounted on a camera, the camera being shown in fragmentary form, and this view particularly illustrating the manner in which the digital recording head is mounted in a housing, and the manner in which an optical path is provided from the recording head into the camera.
Figure 10:
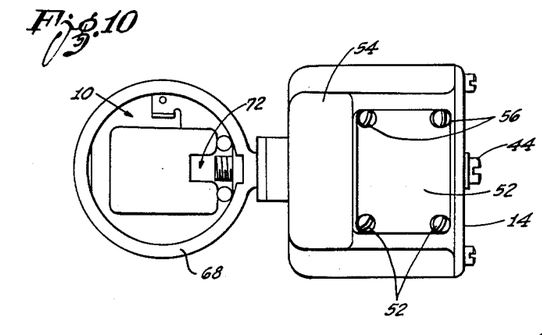
FIGURE 10 is a front elevational view of the lens of the camera and of the digital recording head assembly of the invention as mounted on the camera, this latter view showing in somewhat more detail the lens system in the optical path from the digital recording film strip in the camera.

The views of FIGURES 9 and 10 illustrate the housing 14, and its internal elements, on an enlarged scale with respect to FIGURES 1 and 2. This view shows in detail the manner in which the digital recording head 12 is supported in the housing, and by which an optical path is provided from the front face of the digital recording head to the camera 10. As illustrated in FIGURE 9, a terminal block 40 is supported on the housing, and the various leads 28 to the individual lamps 26, and to the ground clips 30, may be connected to this terminal block to receive the external connections.

The digital recording head 12 is mounted in an upright position within the housing 14. To this end, the recording head is supported at one end by a cover plate 42 which, in turn, is secured to the housing 14 by means of screws, such as the screws 44. This permits the digital recording head to be removed from the housing 14 for lamp replacement, merely by releasing the screws 44 and by removing the cover plate 42 and the attached recording head 12 from the housing 14.

The digital recording head 12 is supported within the housing 14 so that its front face 46 is directed towards the forward end of the housing. A mirror 50 is supported in the forward end of the housing on a cover plate 52. The cover plate 52 is supported on an inclined portion 54 of the end wall of the housing 14. The cover plate 52 is secured to the inclined portion 54 of the end wall by a plurality of screws 56. The mirror 50 is positioned in the optical path which extends from the front face 46 of the digital recording head 12. As illustrated in FIGURE 9, the optical axis from the front face 46 of the digital recording head 12 to the mirror 50 is represented by a line 60. The mirror 50 serves to deflect the optical axis 60 through 90 degrees and along a line 62 and through an aperture 64 in the side wall 66 of the housing.

As mentioned above, the housing 14 is supported on the door 16 of the camera 10, and it is so supported that its aperture 64 is disposed in axial alignment with an aperture 66 at the side of the lens assembly 68 of the camera 10. A light seal 70 is cemented to the housing 14 to prevent external light from entering the aperture 66.

A small lens assembly 72 is positioned in the camera lens assembly 68 adjacent the aperture 66. The latter lens assembly includes a prism 74 which serves to displace the optical axis 62 through 90 degrees so as to project light images from that optical axis along an optical axis 76 to the film strip in the motion picture camera 10. This enables images of the illuminated sub-miniature electric lamps in the digital recording head 12 to be directed into the camera 10 and to be recorded adjacent the film frames of the film strip in the camera, as described in conjunction with FIGURE 3.

Figure 11:
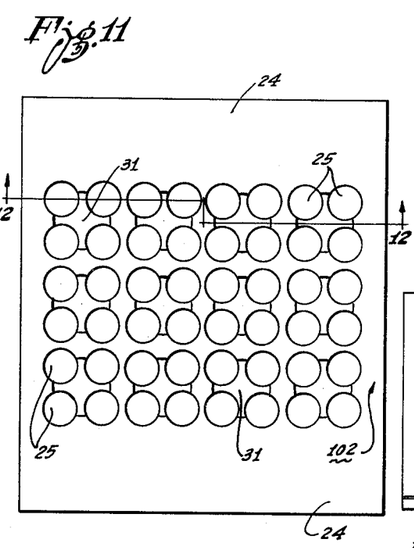
FIGURE 11 is a top view of a block included in the embodiment of the recording head to be described, this view showing a group of holes drilled through the block to receive the lamps, with the walls between groups of the holes being reamed out to facilitate the releasable convenient mounting of the lamps, as will be described.
Figures 12, 14:
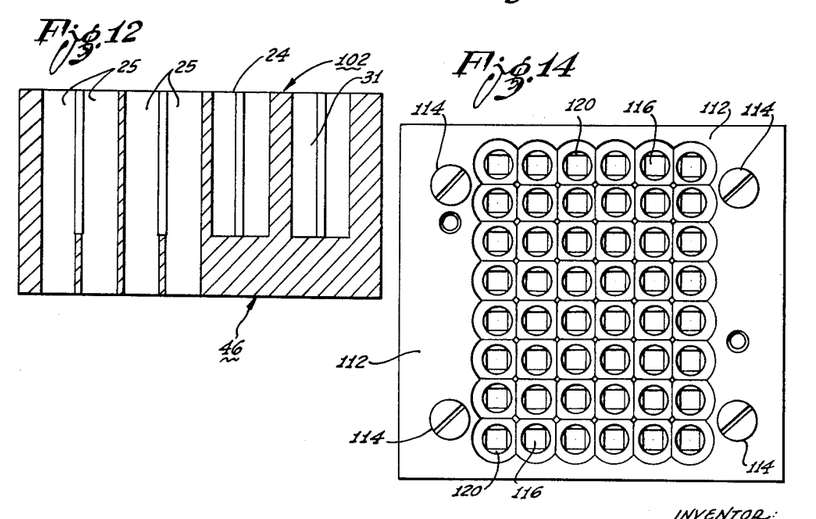
FIGURE 12 is a sectional view of the apertured block of FIGURE 11 substantially on the line 12—12 of FIGURE 11, and this latter view illustrates more clearly how the lamp-receiving holes extend through the block and how the reamed out portions between clusters of the lamp-receiving holes extend partially through the block to receive the resilient ground clips and to enable the same to bear against the conductive tubular sides of the lamps in the different holes of the corresponding clusters, as will be described.
FIGURE 14 is a bottom view of the recording head to reveal that the thin plate has rectangular apertures which are aligned with the lamp-receiving holes in the block so as to maintain the miniature lamps in the different holes of the block, and this latter view also illustrating that the thicker support plate has apertures aligned with the rectangular apertures of the thin plate to enable the illuminations from the different lamps to be directed onto the film strip in the motion picture camera, as will be described.
Figure 13:
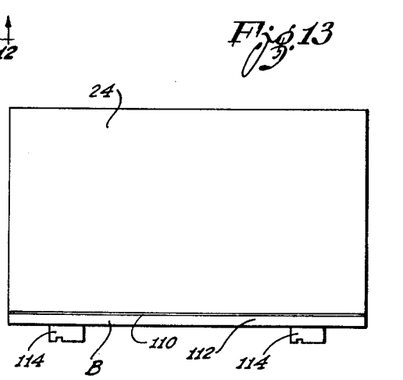
FIGURE 13 is a side view of the digital recording head of the invention to show the manner in which a thin apertured plate and a thicker support plate are fastened to the block of the head.

The block 24 of the digital recording head 12, and its associated components, are shown in more detail in FIGURES 11-16. As shown, for example, in FIGURES 11 and 12, the block member 24 has a plurality of the lamp-receiving apertures 25. These apertures extend through the block from its rear face 102 to its front face 46. In the illustrated embodiment, the apertures 25 are arranged in rows and columns, with eight apertures being included in each row, and with six apertures being included in each column. As illustrated in FIGURES 11 and 12, for example, the apertures are arranged in groups of four, and portions of the rear face 102 of the block 24 are reamed out, so as to form the holes 31 in the rear face between the four apertures of each group. These holes extend inwardly from the rear face of the block 24 and partially through the block, and each of the holes 31 extends through the wall of each of the apertures of its corresponding group to intersect such apertures. As mentioned above, the depressions 106 in the rear face are formed to receive the resilient ground clips 30 of FIGURES 6 and 8. These ground clips, as also mentioned above, serve not only to establish electrical connections to the electric lamps, but also to releasably hold the lamps in the different apertures.

In a constructed embodiment of the invention, the dimensions of the block 24 were 1 x .9 x 5 inches; and the depressions 31 were .132 inch in diameter and had a depth of .350 inch. These depressions were provided with flat bottoms, as shown in FIGURE 10.

Figure 15:
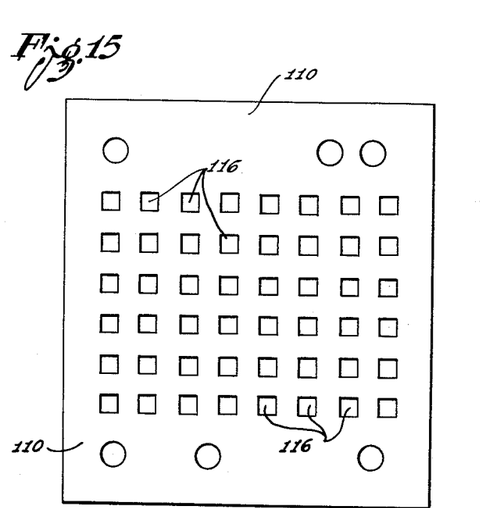
FIGURE 15 is a detail plan view of the thin apertured plate referred to above with its rectangular apertures.

As illustrated in FIGURES 13, 14, 15 and 16, for example, a thin support plate 110 and a thicker reinforcing plate 112 are secured to the front face of the block 24 by a plurality of screws 114. The thin supporting plate 110, as best shown in FIGURE 15, is provided with a plurality of rectangular apertures 116. These apertures are axially aligned with the apertures 25 in the block member 24, but have a smaller cross-sectional diameter. The apertured support plate 110 serves to hold the individual lamp assemblies 26 in the apertures 25 in the block 24. The reinforcing plate 112 is thicker than the apertured plate 110, and it has apertures 120 (see FIGURE 14) aligned with the apertures 116 in the plate 110 and with the apertures 25 in the block 24. The rectangular apertures 116 of the plate 110 must be accurately formed and precisely aligned with the apertures 106 in the block member, so that they may properly perform their lamp supporting function. The apertures 116 may, for example, be formed by any suitable known photo-etching process as, for example, a 10–1 reduction.

Figures 16, 17:
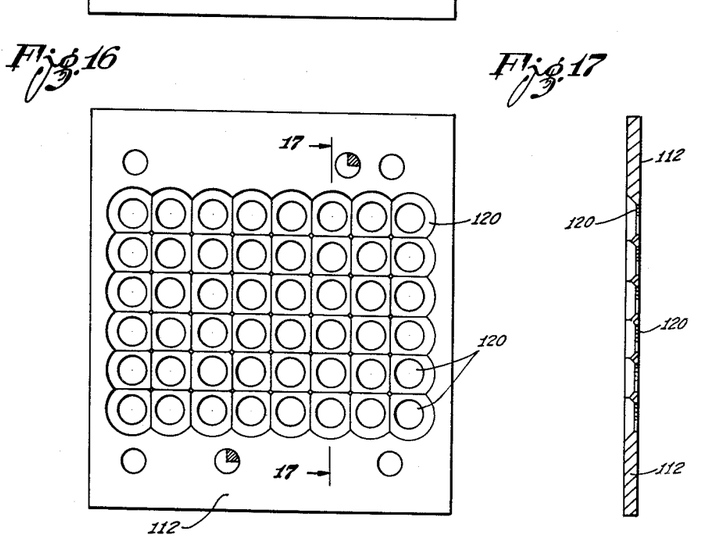
FIGURE 16 is a detail plan view of the thicker support plate, also referred to above, with its circular apertures.
FIGURE 17 is a side sectional view of the plate of FIGURE 16, substantially on the line 17—17 to show the shape of the apertures in the latter plate.

The apertures 120 in the disc 112 need not be as accurately aligned as the apertures 116. These latter apertures may be formed by any suitable drilling and reaming process. As illustrated in FIGURE 17, for example, the apertures 120 may be formed with a 45 degree inclination, flaring outwardly towards the front of the recording head assembly.

The digital recording head assembly, as described above, is capable, therefore, of supporting an array of individually energized electric lamps. These lamps may be individually energized in accordance with received information which is converted into individual digital signals. The resulting digital signals may then be introduced to the digital recording head, so that the lamp illuminations corresponding to these signals may be recorded on the film strip in correlation with the pictorial recording of the subject under test.

The digital recording head described above, is convenient in that the various sub-miniature lamp assemblies supported in it may be conveniently removed, in the described manner, for replacement purposes. The entire assembly, as described above, is rugged and compact, and it is supported in a convenient and improved manner, so that its digital information may be directed into an existing camera. Moreover, the entire assembly of the present invention in at least one of its aspects is so conceived, that the existing camera may be readily adapted to receive the digital information from the digital recording head; the adaptation requiring but a simple modification to the camera.

Figure 18:
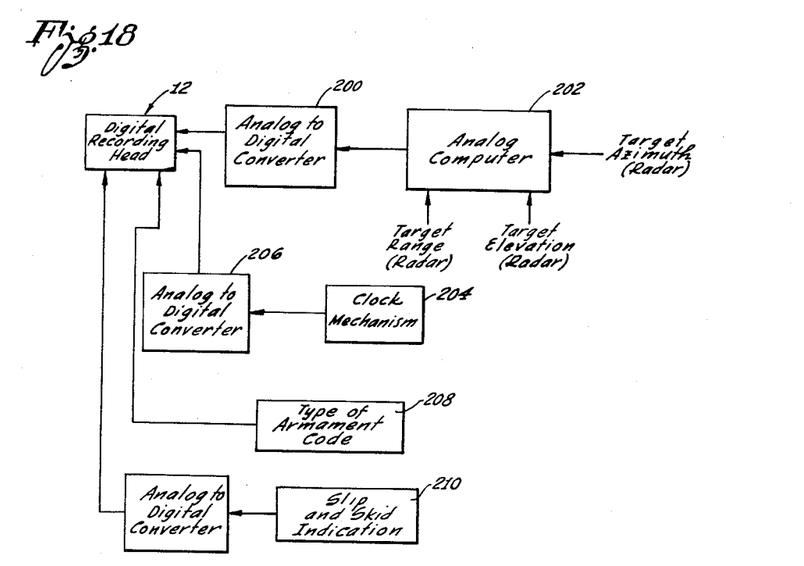
FIGURE 18 is a block diagram of a typical system incorporating the apparatus of the invention.

A typical set up for testing a fire control system, and which utilizes the concepts of the present invention, is illustrated in FIGURE 18. The system of FIGURE 17 includes the digital recording head 12 which, as described above, is mounted on a camera. The camera is supported in the vehicle whose fire control system is to be tested. The camera provides a pictorial record on its film strip of the target and of the gunsight reticle of the weapon controlled by the fire control system.

The system of FIGURE 18 includes, for example, an analog-to-digital converter 200 which is coupled to the digital recording head 12. An analog computer 202 is coupled to the converter 200. The analog computer 202 is coupled to the converter 200. The analog computer contains certain shafts which are angularly positioned in accordance with input signals introduced to the computer. These input signals are derived, for example, from the radar system of the vehicle, and they include signals pertaining to the range of the target, to the target elevation and target azimuth with respect to the vehicle.

The system of FIGURE 18 also includes a clock mechanism 204. This clock mechanism provides signals representing the time elapsed from any particular reference time. The reference time, for example, may be the start of a time the flight started, or it may represent the time the element was first used. The signals from the clock mechanism 204 are introduced to an analog-to-digital converter 206. This converter responds to the signals from the clock mechanism 204 to convert them to a digital code. The converter introduces its output signal to the digital recording head 12. The output signal from the converter 206 is constituted to represent time in hours, minutes, seconds and tenths of seconds.

The system of FIGURE 18 may also include a unit 208 which provides different types of output signals dependent upon the type of armament used in any particular attack. Unit 208 introduces its output signals to the digital recording head 12, so that a record of the type of armament may appear on the digital matrix of the film strip in the camera.

A unit 210 is also included in the system of FIGURE 18, and this unit provides signals indicative of miscellaneous conditions, such as slip or skid, or other data concerning the vehicle. The signals from the unit 210 are converted to digital signals by the converter 212, and the resulting digital signals are introduced to the digital recording head 12 to be recorded on the film strip in the camera.

It will be appreciated that the system shown in block form of FIGURE 18 is merely a schematic representation of a typical system which may be used to provide desired digital signals for recordation on the film strip. It will be appreciated that many other conditions may be monitored, and it is merely necessary to provide a means for providing digital signals representing the condition monitored, and for introducing such signals to the digital recording head 12.

The following data may be collected by the system of FIGURE 18, and fed in coded digital form to the digital recording head 12: The azimuth and elevation and angles of the target, the range of the target; the time in hours, minutes, seconds and one-tenth seconds which have elapsed from a given reference time; the type of armament to be used; slip or skid indications of the attacking vehicle. Also, and as noted above, other parameters can also be monitored and converted into digital signals for application to the digital recording head 12, and for recordation on the film strip.

The radar system of the attacking vehicle derives information concerning target range, target elevation and target azimuth, and feeds the signals to the computer 202. The signals are utilized in the computer to angularly position respective shafts in the computer. The angular position of the shafts in the computer 202 are sensed by appropriate sensing systems, and the sensing signals developed thereby are introduced to the analog-to-digital converter 200. The analog-to-digital converter 200 includes, for example, a plurality of digitizing discs, and these discs are positioned respectively by the range, azimuth and elevation signals developed by the sensing system in the computer 202. The digitizing discs in the analog-to-digital converter 200 produce respective digital signals representative of the angular positions of the corresponding shafts in the computer 202. These digital signals then represent the azimuth, range and elevation of the target, and they are applied to the digital recording head 12 for recordation on the film strip in the camera, in the manner described above.

The clock mechanism 204 includes a precision gear mechanism which angularly positions a shaft in accordance with the time elapsed from a given reference, such as the start of the attack. A sensing system in the mechanism introduces control signals to the analog-to-digital converter 206. The analog-to-digital converter 206 includes digitizing discs which provide digital output signals corresponding to a time record in hours, minutes, seconds and tenths of seconds. The analog-to-digital converter 212 may also introduce a control signal to the camera unit, so that the camera will start recording when the gunsight is uncaged, for example, and when the range is within a predetermined value.

Figure 19:
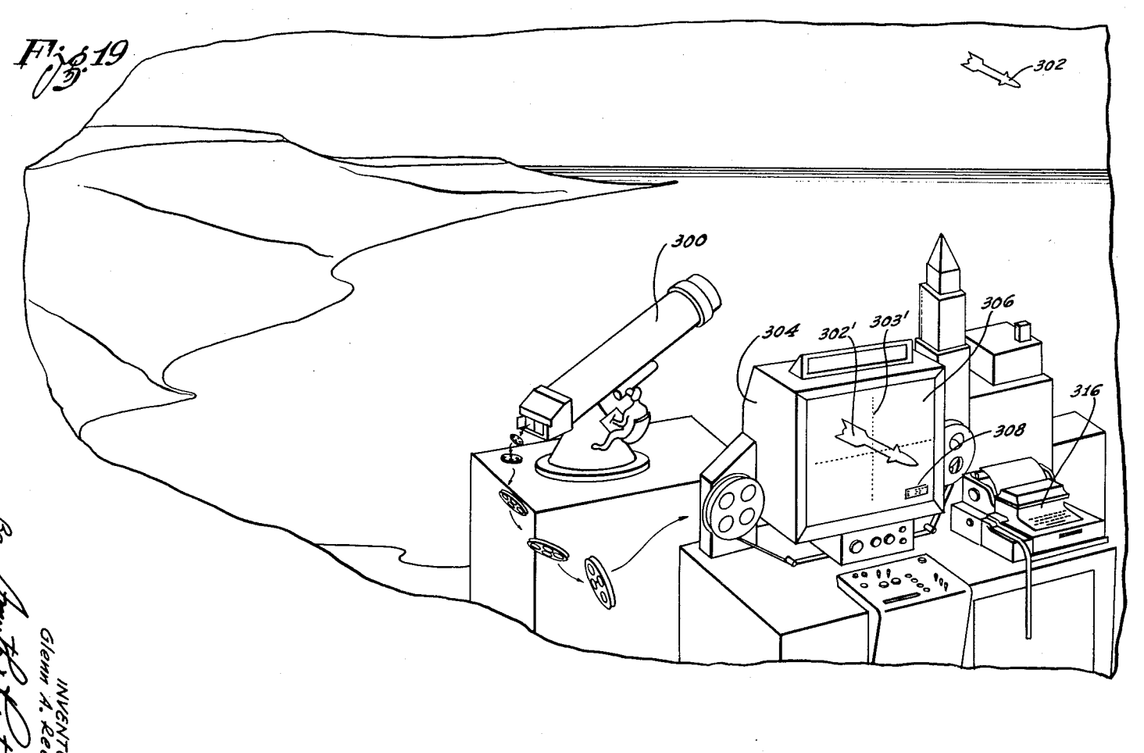
FIGURE 19 is a pictorial, schematic representation of a suitable system and apparatus for reading the pictorial and digital information recorded on a film strip by the equipment of the invention.

An appropriate system for reading pictorial and digital information recorded on the film strip of FIGURE 3 is shown pictorially in FIGURE 19. In the system of FIGURE 19, a camera 300 is directed at a target 302, and a film record is made in the described manner of the target, of the reticle, of the armament associated with the camera 300, and of certain digital information. The resulting pictorial record is recorded on a film strip in the camera 300, and the film strip may subsequently be processed through a film display unit 304. The unit 304 displays on its screen 306 the pictorial record 302' of the target 302 and a pictorial record 303' of the gunsight reticle. The screen 306 also displays a digital image matrix 308 which contains the associated data which was recorded digitally on the film strip in the manner described above.

Figure 20:
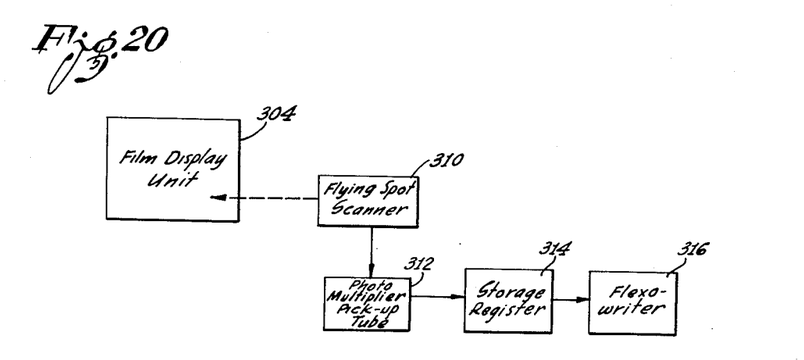
FIGURE 20 is a block diagram of a system suitable for sensing the digital information recorded on a film strip by the apparatus of the invention.

The digital matrix 308 of FIGURE 19 may be scanned by a television type flying spot scanner, represented by the block 310 in the system of FIGURE 20. The resulting output signals from the flying spot scanner 310 are introduced to a photo-multiplier tube 312, and the signals from the photo-multiplier tube are stored in a storage register 314 for subsequent application to an output unit, such as Flexowriter 316. Therefore, the light passing through the digital data field is translated into signal voltages by the scanner 310 and the photo-multiplier tube 312. These signal voltages are fed to the storage register 314. This storage register may be an interim flip-flop storage register, and it is used to feed a typical decoding diode matrix. The resulting output signals are introduced to the Flexowriter 316 which provides a usual punched tape record of the reading.

By the provision of appropriate equipment, the apparatus and system of the invention may be used for other applications, as noted above. These other applications may include the monitoring of radar displays, instrumentation of new aircraft equipment, instrument panel displays, photographic reconnaissance, and other applications where a permanent pictorial record of pertinent test data are desired. The advantage of the type of data collection possible with the equipment of the present invention is that each frame of pictorial information has digital data associated with it, giving permanent records that cannot be erased and which are easily stored for future reference.

As noted above, the mechanism and system of the present invention finds many other uses. For example, the equipment may be used for missile tracking and for engineering tests, as mentioned above. In fact, the equipment and system of the invention may be used for any application in which useful information can be obtained by the provision of a pictorial record together with the correlated recording of data relevant to the pictorial record.

The invention provides, therefore, an improved digital recording mechanism for providing a visual representation of data pertaining to a pictorially recorded test subject. The digital recording mechanism of the invention is advantageous in that it is simple and rugged in its construction. The mechanism is also advantageous because it can be installed simply and relatively inexpensively on existing motion picture cameras. Moreover, the mechanism is conceived so that an array of electrically energized sub-miniature lamp assemblies, included in the mechanism, are supported in an improved manner which permits the convenient replacement of burned-out lamp assemblies.

I claim:

1. In apparatus for recording pictorial and digital information on a recording medium and which includes camera means for housing the recording medium and for introducing to the recording medium for recordation thereon optical images of the particular pictorial information to be recorded: a plurality of groups of electric lamps, a block member having a plurality of groups of apertures extending completely therethrough for receiving and supporting the plurality of groups of electric lamps positioned in an array to provide digital indications at a face of the block upon the selective energizing of the lamps, and said block further having a plurality of holes formed therein between the apertures of respective ones of said groups and intersecting such apertures, a plurality of resilient electrically conductive clips, said holes extending partially through the block to receive respectively the plurality of resilient electrically conductive clips for a resilient engagement between the clips and the lamps in the apertures of the corresponding groups, each of the clips serving to releasably maintain the lamps in the apertures of the corresponding group and to provide a common electrical connection to such lamps.

2. In apparatus for recording pictorial and digital information on a recording medium and which includes camera means for housing the recording medium and for introducing to the recording medium for recordation thereon optical images of the particular pictorial information to be recorded; the combination of: a block member having a plurality of groups of apertures extending completely therethrough, a corresponding plurality of groups of electric lamps supported by the block in the apertures in positions to form an array providing digital indications at a first face of the block upon the selective energizing of the lamps, said block further having a plurality of holes formed therein between the apertures of respective ones of the groups and intersecting such apertures, said holes extending partially through the block from a second face opposite to said first face thereof, and a plurality of electrically conductive resilient clips respectively positioned in said holes to resiliently engage the lamps in the apertures of the corresponding groups and to releasably maintain the lamps in the apertures and to provide common electrical connections to the lamps in respective ones of the groups.

3. In apparatus for recording pictorial and digital information on a recording medium and which includes camera means for housing the recording medium and for introducing to the recording medium for recordation thereon optical images of the particular pictorial information to the recorded, the combination of: a block member having a first face and a second face and having a plurality of groups of apertures extending completely therethrough from the first face to the second face, a plurality of groups of electric lamps positioned as an array within the apertures in the different groups to provide digital indications at the second face of the block upon the selective energizing of the lamps, a supporting plate for the lamps and secured to the second face of the block member and having apertures in respective alignment with the apertures in the block member but of smaller cross-sectional dimensions, and said block further having a plurality of holes formed therein between the apertures of respective ones of said groups and intersecting such apertures, said holes extending partially through the block from the first face thereof, and a plurality of resilient electrically conductive clips positioned within the holes and resiliently engaging the lamps in the apertures of the corresponding group, each of the clips serving to releasably hold the lamps in the adjacent apertures of and to establish a common electric connection to such lamps.

4. In apparatus for recording pictorial and digital information on a recording medium and which includes camera means for housing the recording medium and for introducing to the recording medium for recordation thereon optical images of the particular pictorial information to be recorded, the combination of: a block member having a first face and a second face and having a plurality of groups of apertures extending therethrough from the first face to the second face, a corresponding plurality of groups of electric lamps supported by a the block in the apertures in positions to form an array providing digital indications at the second face of the block upon the selective energizing of the lamps, a supporting plate for the lamps mounted on the second face of the block member and having apertures extending therethrough in respective alignment with the apertures in the block but of smaller cross-sectional dimensions, said block further having a plurality of holes formed therein between the apertures of respective ones of said groups and intersecting such apertures, said holes extending partially through the block from the first face thereof, and a plurality of resilient electrically conductive clips positioned in respective ones of said holes to resiliently engage the lamps in the apertures of the corresponding groups so as to releasably maintain the lamps in the apertures and to provide common electrical connections to the lamps in respective ones of the groups.

5. A digital recording head assembly including: a block member having at least one group of apertures therein, a corresponding group of electric lamps received and supported in respective ones of the apertures and positioned in an array to provide digital indications at a face of the block member upon the selective energizing of the lamps, said block member further having a hole formed therein between the apertures of the group and intersecting such apertures, said hole extending at least partially through the block, and a resilient electrically conductive clip received and supported in said hole in resilient engagement with the lamps in the apertures for releasably maintaining the lamps in the apertures and for establishing a common electrical connection to the same.

6. A digital recording head assembly including: a block member having a plurality of groups of apertures extending therethrough, a corresponding plurality of groups of electric lamps received and supported in said groups of apertures and positioned as an array to provide digital indications at a first face of the block upon the selective energizing of the lamps, said block further having a plurality of holes formed therein between the apertures of respective ones of the groups and intersecting such apertures, said holes extending partially through the block from a second face opposite to the first face, and a plurality of resilient electrically conductive clips received and supported in respective ones of said holes to resiliently engage the lamps in the apertures of the corresponding groups, each of the clips serving to releasably maintain the lamps in the apertures of the corresponding group and to provide a common electrical connection to said lamps.

7. The head assembly set forth in claim 6 in which each of the electric lamps is provided with a conductive casing and is provided with a second terminal within the casing and in which each of the clips is provided with a configuration to press resiliently against the casing of a particular group of the lamps in the plurality to provide a ground potential for the lamp casing and in which a supporting plate for the lamp assemblies is secured to the second face of the block member and is provided with apertures in alignment with the apertures in the block member.

8. A digital recording head including in combination: a block member having a first face and a second face and having a plurality of holes formed in the first face thereof, said block member further having a plurality of apertures extending therethrough from the first face to the second face thereof and arranged in clusters about respective ones of said holes in intersecting relationship therewith, a plurality of tubular electric lamp assemblies positioned in respective ones of the apertures to provide digital indications at the second face of the block upon the selective energizing of the lamps, a plurality of resilient electrically conductive clips positioned in respective ones of the holes in the first face of the block member in resilient frictional and electrical engagement with the lamps positioned in the corresponding intersecting ones of the apertures to releasably maintain the lamp assemblies in the apertures and to establish common electrical connections to the lamp assemblies in respective ones of the clusters of apertures.

9. The combination defined in claim 8 and which includes a supporting plate for the lamp assemblies secured to the second face of the block member and having apertures in respective alignment with the apertures in the block member but of smaller cross-sectional dimensions.

10. The head set forth in claim 8 in which each of the clips is provided with a configuration to press against a particular group of lamps in the plurality at an intermediate position of the clips and in which each of the clips is connected to provide a ground potential for the lamps and in which a supporting plate for the lamp assemblies is secured to the second face of the block member and is provided with apertures in the block member but of smaller cross-sectional dimensions.

References Cited in the file of this patent

UNITED STATES PATENTS

| | | |
|---|---|---|
| 2,449,450 | Carlson | Sep. 14, 1940 |
| 2,619,402 | McCutcheon | Nov. 25, 1952 |
| 2,821,691 | Andre et al. | Jan. 28, 1958 |
| 2,868,064 | Henkel | Jan. 13, 1959 |
| 2,918,603 | Rieth | Dec. 22, 1959 |